June 19, 1962 W. M. HALL 3,039,305
SONIC REGION DETECTOR
Filed May 13, 1959 3 Sheets-Sheet 1

MACH NUMBER DOWNSTREAM
OF SHOCK FRONT AND
DOWNSTREAM PRESSURE RATIO
VERSUS FREESTREAM MACH NUMBER

INVENTOR.
William M. Hall
BY
Robert B. Gerhardt
ATTORNEY

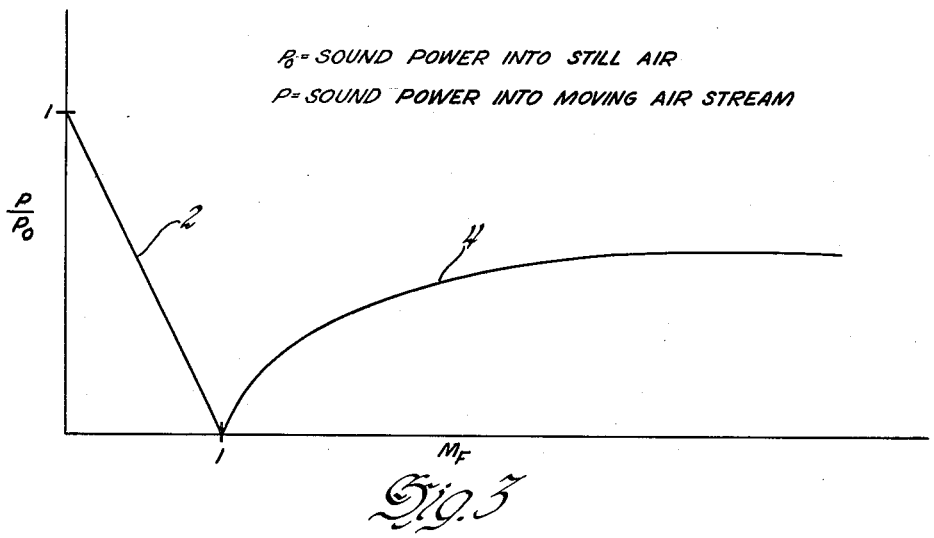
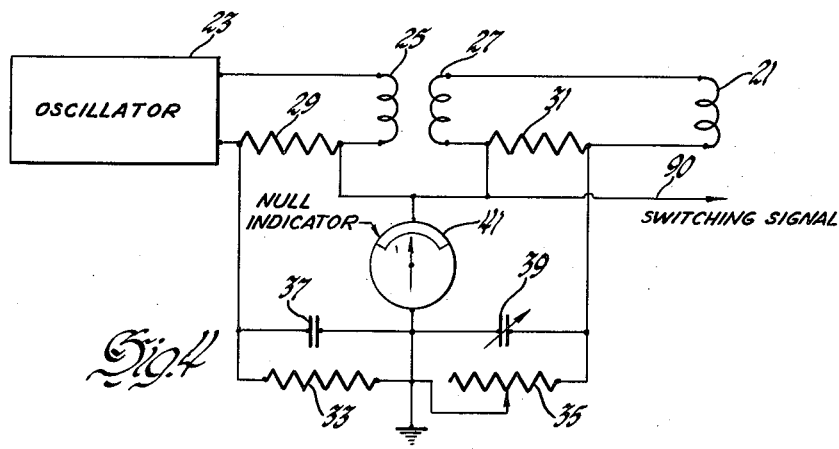
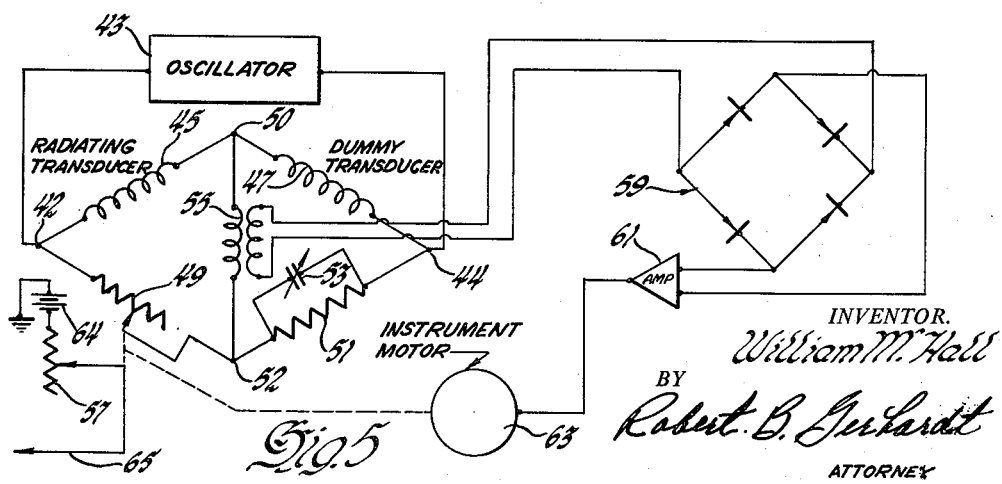

June 19, 1962  W. M. HALL  3,039,305
SONIC REGION DETECTOR
Filed May 13, 1959  3 Sheets-Sheet 3

INVENTOR.
William M. Hall
BY
Robert B. Gerhardt
ATTORNEY

United States Patent Office 3,039,305
Patented June 19, 1962

3,039,305
SONIC REGION DETECTOR
William M. Hall, Milwaukee, Wis., assignor to General Motors Corporation, Detroit, Mich., a corporation of Delaware
Filed May 13, 1959, Ser. No. 812,943
6 Claims. (Cl. 73—181)

This invention relates to speed indicators and more particularly to speed indicators for determining subsonic and supersonic Mach number operation of aircraft and guided missiles.

In connection with operation of high speed aircraft it is important to have a continuous indication of the speed of the aircraft relative to the speed of sound in the air medium in which the aircraft is operating. The speed region near sonic velocity is especially critical since the aerodynamic characteristics of the aircraft, the effect of the controls and the operation of the propulsive engine vary considerably in this region. Formation of shock fronts at critical aircraft surfaces must also be noted.

There have been proposed several methods of measuring the velocity of an object moving at subsonic and supersonic speeds, however these methods usually require some additional accurate means to determine whether the operation is above or below sonic speed. The most common method of determining the Mach number involves using a Pitot-static tube probe that senses total and static pressures at the nose of or other leading member of the aircraft. At subsonic speeds the ratio between the total and static pressures can be used to calculate the Mach number by known equations. At supersonic speeds this ratio can also be used, however, at supersonic speeds the functional relationship between the pressure ratio and Mach number is different than at subsonic velocities and a different equation applies to this relationship. Thus some independent means must be employed to select either the subsonic or supersonic Mach number equation.

It is therefore an object of this invention to provide a relatively simple means for determining sonic operation.

It is a further object to provide means that will directly measure the Mach number either with or without the use of a Pitot-static tube.

A further object is to provide a speed measuring system utilizing an active rather than passive means wherein sound waves are emitted into the air stream in combination with means for measuring the power necessary to emit such sound waves.

These and other objects will be apparent by reference to the following detailed description taken in connection with the accompanying drawings in which:

FIGURE 3 is a graph showing the ratio between the power emitted by a sound transducer of the type shown in FIGURE 1 into a moving air stream and that emitted into still air at different Mach numbers;

FIGURE 4 is a schematic representation of a system for indication of sonic operation;

FIGURE 5 is a system for producing a signal indicating subsonic Mach numbers.

Before going into the details of the structure of the invention a discussion of the theory involved will be made. The invention utilizes a sound producer consisting of an electromagnetically driven vibrating steel diaphragm that emits sound waves of a predetermined frequency. The vibrating diaphragm is at one end of a tuned tube, the other end of which is open and faces upstream against the moving air stream. Sound waves from the vibrating diaphragm in the tube are influenced by the motion of the moving ambient air. As the velocity of the air stream increases it suppresses the emission of the sound waves out of the tube and consequently acts to reduce the raditation from the sound producer. This effect is due to the air stream acting as a barrier or acoustical impedance which reflects the sound waves back into the tube. This acoustical impedance increases as the speed of the air stream increases and loads the diaphragm to decrease its excursion by the pulsating magnetic field. This causes the average sound power radiated per cycle by the vibrating plate to decrease from a maximum at zero speed or still air to a minimum or zero output at Mach 1. Simultaneously the power consumed by the electromagnetic driver decreases from a maximum to a minimum at Mach 1. At $M=1$ the tube behaves as though the open end were stopped with a rigid plate which is actually the shock front formed at sonic velocity.

The ratio R of sound power P emitted into an air stream flowing at $M<1$ to the sound power $P_0$ emitted into still air can be represented by (1) $$\left[R=\frac{P}{P_0}=1-M\right]$$

Thus, the relationship between the power emitted and the Mach number of the air stream flowing against the end of the tube is linear. This relationship is shown by the straight line 2 of the graph of FIGURE 3. It is to be understood that the term power as used here and in FIGURE 3 is sound power.

Figure 2:
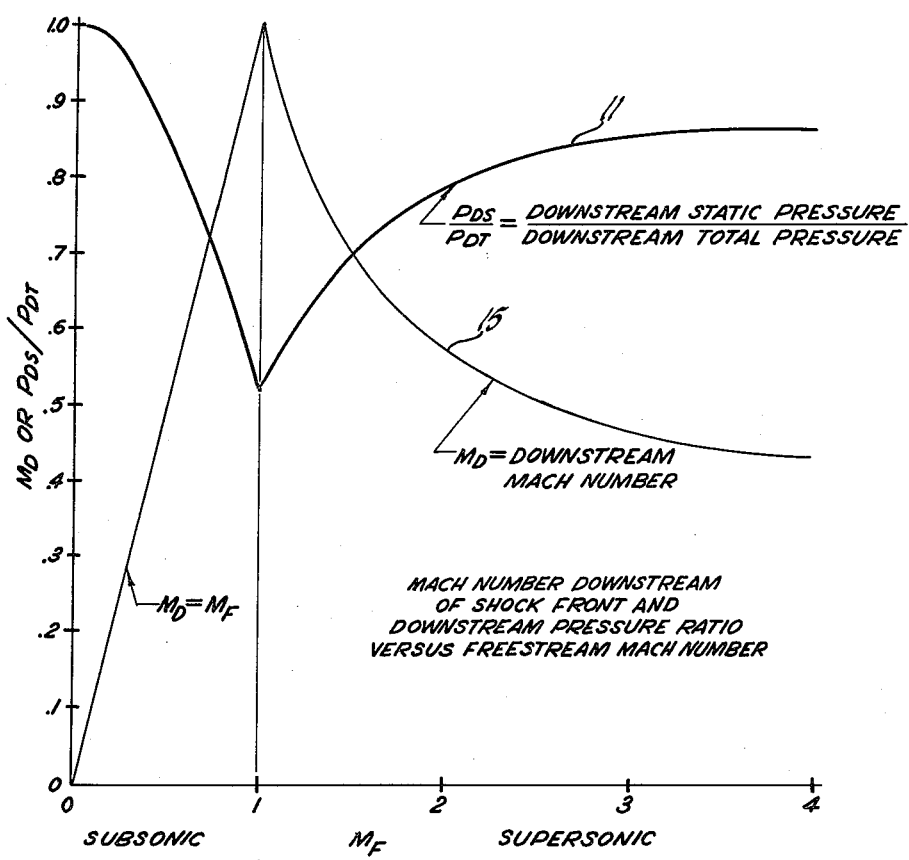
FIGURE 2 is a graph showing various relationships between Mach numbers of air flow upstream and downstream of the shock front and the ratio of static pressure to total pressure of the air stream.

As the air stream speed increases over $M=1$, the free stream air flow shocks down to a flow where $M<1$. Under such conditions the open end of the tube sees a flow where $M<1$ and the sound waves produced by the vibrating plate again begin to emit from the open end of the tube and mix into the spillage air downstream of the shock front that flows around the tube. Therefore, the average power radiated by the vibrating plate begins to increase from the zero level at $M=1$. As the free stream speed increases above Mach 1, the shock front moves further away from the open end of the tube and the sound power emitted increases. The Mach number $M_D$ of the air flow downstream of the shock front varies in a known manner with Mach number $M_F$=free stream velocity or the air flow upstream of the shock front. This relationship can be expressed by the formula:

(2) $$\left[M_F^2=\frac{2+(\gamma-1)M_D^2}{2\gamma M_D^2-(\gamma-1)}\right]$$

where $M_F$ is the free stream Mach number, $M_D$ is the Mach number of the air flow downstream of the shock front and $\gamma$ is the ratio of specific heats of the ambient medium or approximately 1.4 for air at normal temperatures and pressures. Therefore, since it is now easy to measure the downstream Mach number $M_D$ by noting the ratio of sound power radiated into the moving air to the power emitted into still air, by using the Equation 2 above, it is possible to determine the free stream Mach number $M_F$. The relationship between the power ratio $P/P_0$ and the free stream Mach number $M_F$ is shown by portion 4 of the curve of FIGURE 3. FIGURE 2 shows the relationship between the downstream Mach number $M_D$ and the free stream Mach number $M_F$. It should be noted that where the free stream Mach number is less than unity the downstream Mach number $M_D$ is equal to $M_F$. Above $M_F=1$ the downstream Mach number $M_D$ decreases from 1 as shown by curve 15 which is a plot of Equation 2 above.

Figure 1:
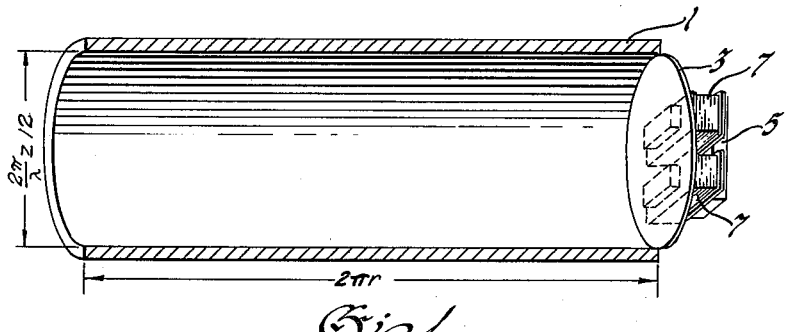
FIGURE 1 is a partially cut away view of a representative sound transducer used in the invention.

Proceeding now to practical applications and illustrative embodiments of the invention reference is made to FIGURE 1 which shows the sound transducer, which includes a tube 1 having a steel vibrating diaphragm 3 in one end thereof. Armature 5 energized by windings 7 in turn actuated by an oscillator, not shown, acts to magnetically vibrate the diaphragm 3. In order that the acoustic impedance of an open tube be composed mainly of acoustic resistance, then the quantity $$\frac{4\pi r}{\lambda}$$

should be greater than 12. See "Vibration and Sound," by Philip M. Morse, 2nd Edition, McGraw-Hill, at page 246. This reference also suggests that the tube's length be equal to the perimeter or $l=2\pi r$. Under atmospheric conditions $\lambda=v/f=1100$ ft./sec./10,000 cycles per second$=0.11$ ft.$=1.32$ inches. Substituting this value of $\lambda=1.32$ in the equation.

$$\frac{4\pi r}{\lambda} \geq 12$$

$r \geq 1.26$ inches or $D \geq 2.52$ inches. The length $l$ then should be equal to or greater than $2\pi \times 1.26 = 7.93$ inches.

The simplest application of the invention is in a sonic indicator or device to determine when the free air flow is at $M=1$ speed. This application would be useful wherever it is desirable to determine the instant at which a moving object is passing from subsonic to supersonic velocity or at the formation of a shock front. FIGURE 4 shows a schematic system which will serve this purpose and includes a sound transducer represented by an inductance winding 21 which corresponds to the driving winding of the transducer device shown in FIGURE 1.

The transducer winding 21 is energized by an audio frequency oscillator 23 which may be of any suitable form but which should have fairly good frequency and voltage stability. The A.C. signal from the oscillator 23 is coupled to the winding 21 through a coupling transformer having a primary winding 25 and a secondary winding 27. The impedance of winding 25 should be large compared to the impedance of winding 27 so that the current flow in the oscillator circuit will be relatively unaffected by changes in current flow in the transducer circuit. The oscillator circuit also includes a fixed resistor 29 and the transducer circuit has a fixed resistor 31.

An impedance bridge consisting of the oscillator and transducer resistors 29 and 31, a fixed resistor 33, a calibration resistor 35, a fixed capacitor 37 and a variable phase calibration capacitor 39 provides a circuit for determining the point of maximum impedance of the transducer winding 21. A null indicator 41, such as a milliammeter, is connected across the oscillator and transducer branches of the bridge.

To calibrate the bridge for null point reading, the end of the transducer tube would be closed to simulate the shock front blockage at $M=1$ operation. The variable resistance 35 and variable phase balancing capacitor 39 would then be adjusted to give a null or mid point reading on the milliammeter 41. During operation of the device in still air or zero velocity, the bridge will be unbalanced due to the low A.C. impedance of winding 21. With a low impedance presented by winding 21 there will be a relatively large current flow in the transducer circuit and, hence, a large voltage developed across resistor 31. Since the current flow in the oscillation circuit is essentially constant due to the relatively large impedance of the primary winding 25, the voltage across resistor 29 will remain constant and the bridge will be in an unbalanced condition.

As the speed of the air stream into which the transducer radiates increases the acoustical impedance of the transducer also increases. The load on the plate 3 of the transducer will also increase causing the reactance of winding 21 to increase. With an increasing reactance or impedance of winding 21, the A.C. current flow in the transducer circuit 27—21—31 will decrease and the voltage across resistor 31 will likewise decrease. When the air stream speed reaches sonic velocity, and the shock front effectively acts as a barrier to sound emission from the transducer tube, the impedance on the vibrating diaphragm and winding 21 reaches a maximum and the current in the transducer circuit is reduced to a minimum value. The voltage across resistor 31 is then at the calibration level and the bridge becomes balanced with the milliammeter indicator 41 indicating a null condition.

The null condition or zero current flow can be utilized to actuate a switch or other device to provide a signal useful on any application. The transducer tube can suitably be placed for shock front detection of local sonic flow. The critical speed of an airplane or missile is that speed where local sonic flow sets in at some portion of the aircraft's skin. The placement of the transducer tube at a location where sonic flow detection is desired will then provide a critical air speed signal.

The invention can also be utilized to provide a variable signal indicating subsonic Mach numbers. Such an arrangement is schematically shown in FIGURE 5. This system utilizes a self-balancing impedance bridge. An audio frequency oscillator 43, similar to oscillator 23 of the FIGURE 4 arrangement, has an output across points 42 and 44 of the bridge. Inductance coil 45 is the vibration producing winding of the radiating transducer located in the air stream. Coil 47 is a corresponding winding of a dummy transducer located in the aircraft in a static atmospheric pressure area. Potentiometer 49 is a balancing resistance actuated by a motor 63 while resistance 51 and variable capacitor 53 complete the bridge.

A null output coupling transformer 55 has its primary winding located across points 50 and 52 of the bridge. The secondary winding of the transformer 55 is connected through a full wave rectifier bridge 59 to a D.C. amplifier 61. The output of amplifier 61 energizes the instrument motor 63 which positions the balancing potentiometer 49 and simultaneously positions an output potentiometer 57 to control a signal voltage.

Figure 8:
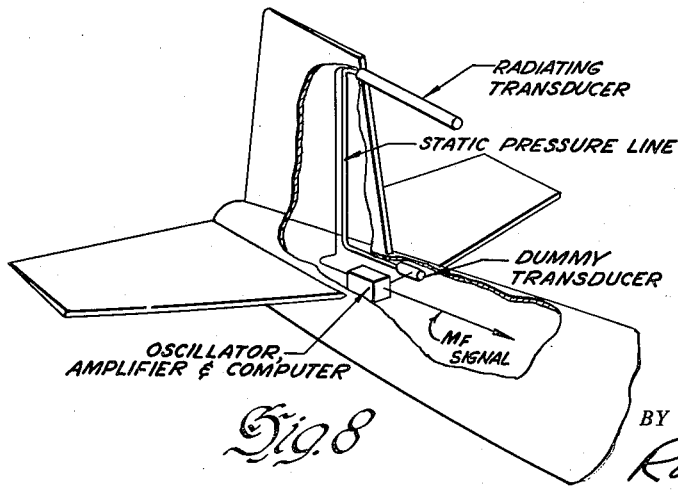
FIGURE 8 illustrates the invention in an aircraft.

The bridge is initially calibrated with the radiating transducer 45 operating in still air. Capacitor 53 is adjusted to provide proper phasing to give a zero null output from the null transformer 55. During operation with the radiating transducer located in the moving air stream, the impedance of the winding 45 changes with the speed of the free flow air stream. As the impedance of winding 45 increases, the bridge becomes unbalanced resulting in a voltage of the oscillator frequency developed across the primary of the null output transformer 55. This A.C. null voltage is rectified by the bridge 59 and amplified by amplifier 61 to actuate the D.C. motor 63. Motor 63 mechanically moves the arm of potentiometer 49 until the bridge is again balanced with a zero voltage between 50 and 52 and hence a null output to the transformer 55. Simultaneously, the potentiometer 57 is moved by motor 63 to provide an output voltage at 65 from a battery 64. This output voltage at 65 is proportional to the Mach number. As the free stream air flow speed increases and decreases, the motor 63 is continuously actuated to maintain a balanced zero null output condition. Potentiometer 57 is also continually operated to give a varying output voltage at 65 that can be used to operate a Mach meter or utilized as a control voltage. An illustrative location of the radiating transducer and dummy transducer in an aircraft is shown in FIGURE 8. The radiating active transducer is connected to the oscillator and bridge as is the dummy transducer located within the aircraft.

Various other circuits and arrangements can be utilized to provide the subsonic Mach number signal. For example the rectifier bridge 59 may be eliminated and an A.C. amplifier used to actuate an A.C. instrument meter in place of the D.C. motor 63, or the A.C. null output could be used to directly operate an A.C. instrument motor. Also, an audio oscillator having a very stable frequency and voltage controlled output that would be insensitive to load changes could be directly connected to the transducer. Then the coupling transformer 55 of FIGURE 5 or the transformer including winding 27 of FIGURE 4 could be eliminated since the function of these transformers is to prevent changes in the oscillator circuit with changes in the transducer circuit.

Figure 6:
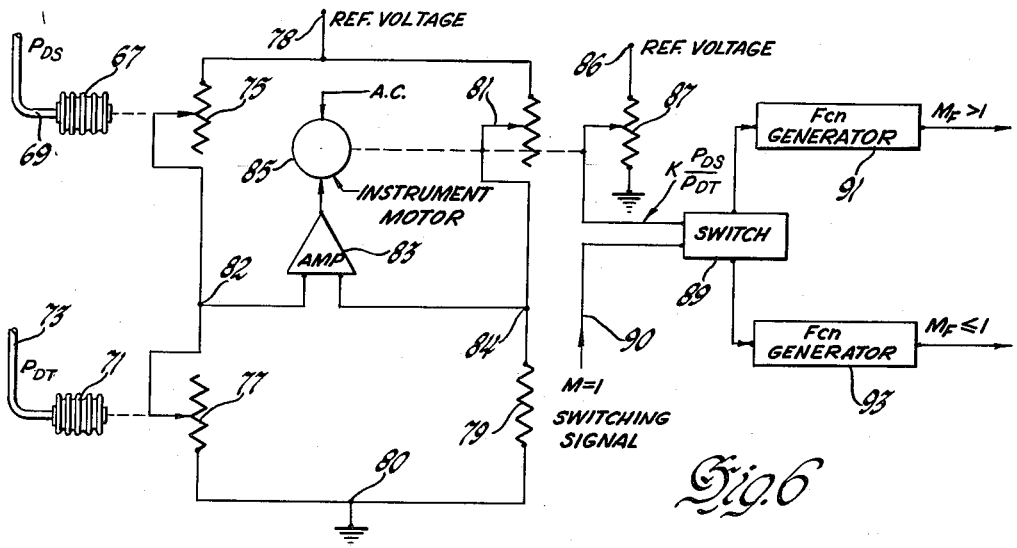
FIGURE 6 is still another system utilizing the indicator device of FIGURE 4 to switch the output of a Pitot-static speed indicator to alternative function generators.

FIGURE 6 illustrates how the invention could be used with a conventional Pitot-static tube speed sensor to provide a subsonic and supersonic Mach number signal. The relationship between the static pressure to total pressure ratio and the Mach number is well known. Curve 11 in FIG. 2 illustrates this relationship. Below $M_F=1$ the Mach number M can be determined by:

$$(3) \quad M_F^2 = \frac{2}{\gamma-1}\left[\left(\frac{P_T}{P_S}\right)^{\frac{\gamma-1}{\gamma}} - 1\right]$$

$M_F$ = the free stream Mach number
$\gamma$ = the ratio of specific heats of the medium = 1.4 for air
$P_T$ = the total or ram pressure of the fluid stream
$P_S$ = the static pressure of the ambient fluid Above $M_F=1$ the relationship can be determined by:

$$(4) \quad M_F^2 = \frac{1+\frac{\gamma-1}{2}M_D^2}{\gamma M_D^2 - \frac{\gamma-1}{2}} = \frac{\gamma-1}{2} \frac{\left(\frac{P_{DT}}{P_{DS}}\right)^{\frac{\gamma-1}{\gamma}}}{\gamma\left(\frac{P_{DT}}{P_{DS}}\right)^{\frac{\gamma-1}{\gamma}} - \left(\frac{\gamma-1}{2}\right)^2}$$

where $M_D$ = the Mach number immediately downstream from the shock front = $M_F$ where $M_F<1$
$P_{DT}$ = the total pressure downstream of the shock front
$P_{DS}$ = the static pressure downstream of the shock front The apparatus illustrated in FIGURE 6 utilizes a Pitot-static tube transducer in connection with a pair of function generators to convert the pressure ratio to the free stream Mach number $M_F$. A static pressure transducer having a static pressure tube 69, bellows 67 and potentiometer 75 is connected in one arm of a resistance bridge. A total or ram pressure transducer having a ram pressure tube 73, bellows 71 and potentiometer 77 is connected in another arm of the same bridge. A fixed resistor 79 and balancing potentiometer 81 form the other arms of the bridge. A fixed voltage is applied across points 78 and 80. Unbalanced voltage across points 82 and 84 of the bridge is amplified by amplifier 83 to operate an instrument motor 85 to move the balancing potentiometer 81 to a position to rebalance the bridge until a zero null voltage is applied to the amplifier 83.

The instrument motor 85 simultaneously operates a potentiometer 87 connected to a reference voltage at 86. The voltage as divided by the potentiometer 87 is applied by a switch 89 to either of a pair of function generators 91 and 93 depending on the condition of the switch 89. The switch 89 is actuated by a $M=1$ signal in lead 90 as controlled by a sonic detector such as the device of FIGURE 4. Function generator 93 is operable when the switch 89 is in its $M \leq 1$ position and provides an output signal representing the free stream Mach number.

Function generator 93 converts the signal from potentiometer 87 proportional to the downstream pressure ratio $P_{DS}/P_{DT}$ in accordance with Equation 3 above to the proper Mach number. The relation between the pressure ratio and Mach number is seen in FIGURE 2 as curve 11. Similarly when the switch 89 is in its $M<1$ position, function generator 91 converts the $P_{DS}/P_{DT}$ signal to a signal representing the free stream Mach number $M_F$ in accordance with Equation 4 above and as seen by the curve 11 of FIGURE 2.

Figure 7:
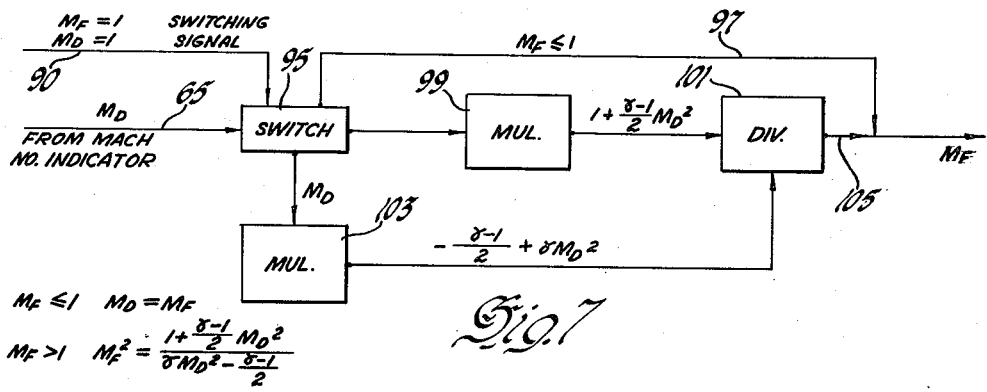
FIGURE 7 is a further system which illustrates the invention used to provide a Mach number signal at both subsonic and supersonic speeds.

FIGURE 7 illustrates how the invention can be utilized to give both subsonic and supersonic free stream Mach number signals without the use of Pitot tube transducers. This can be done by utilizing a Mach number indicator such as that shown in FIGURE 5 in combination with an arithmetic computer and a switching signal from a sonic detector such as that shown in FIGURE 4. In this case direct read out of the Mach number when the aircraft is in $M \leq 1$ operation and computed Mach number readings when the aircraft is in $M>1$ operation can also be obtained. A switch 95 connects the downstream Mach number $M_D$ reading from lead 65, corresponding to the output from the device of FIGURE 5, to a direct reading line 97 when $M \leq 1$ and to an arithmetic computer consisting of multipliers 99 and 103 and divider 101 to give a computed Mach number reading in line 105.

The switch 95 is controlled by a $M=1$ or zero null signal output in line 90 which is connected to a sonic detector such as that shown in FIGURE 4. The computer units 99, 101 and 103 which form no part of this invention can be electromechanical devices similar to those shown and described in S.N. 787,517 entitled "Turbojet Thrust Computer," filed January 19, 1959. The detailed elements are well known and widely used and have been described extensively in the literature. Reference may be made to "Electronic Analog Computers" by Korn and Korn (2nd Ed.), McGraw-Hill, New York, 1956, and "Analog Methods in Computation and Simulation" by Soroka, McGraw-Hill, 1954.

It will be seen that the invention has many applications and can be utilized in various combination and arrangements to produce desired results. The sound transducer is simple and can be easily manufactured to be rugged and accurate. Other arrangements and uses as well as changes in details will be readily apparent to those skilled in the art. The invention is not to be limited by the specific illustrative examples shown and described, but only limited by the following claims.

I claim:

1. An apparatus for indicating when the velocity of an object moving in a fluid medium is equal to the speed of sound in that medium including an acoustical tube carried by the object having a predetermined length and diameter, said tube having one end open and facing in the direction of movement of the object in the fluid medium and the other end closed by a diaphragm, power means for vibrating said diaphragm at a predetermined frequency, means for continuously comparing the power consumed by said power means with that radiated when the object is moving at the speed of sound in the fluid medium at the same static pressure and temperature, and means for indicating when said power actually consumed is equal to that consumed at the speed of sound in the fluid medium.

2. An apparatus for indicating when the velocity of an object moving in a fluid medium is equal to the speed of sound in that medium, the combination including an acoustical tube carried by the object and having a predetermined length and diameter, said tube having one end open and facing in the direction of movement of the object in the fluid medium and the other end closed by a magnetic diaphragm, electromagnetic means for vibrating said diaphragm at a predetermined frequency, said electromagnetic means having an electrical impedance that varies with the amplitude of vibration of said diaphragm, means responsive to changes in the electrical impedance of said electromagnetic means, and means for indicating when said electrical impedance increases to a predetermined maximum value.

3. An apparatus for indicating when the velocity of an object moving in a fluid medium is equal to the speed of sound in that medium including an acoustical tube carried by the object having a predetermined length and diameter, said tube having one end open and facing in the direction of movement of the object in the fluid medium and the other end closed by a magnetic diaphragm, electromagnetic means for vibrating said diaphragm at a predetermined frequency to radiate sound through said tube, an oscillator for supplying A.C. power to said electromagnetic means to said predetermined frequency, means for continuously comparing the power consumed by said electromagnetic means in causing said diaphragm to radiate sound into said tube with that consumed when the object is moving at the speed of sound in the fluid medium at the same static pressure and temperature and means for indicating when said power consumed is equal to that consumed at the speed of sound in the fluid medium.

4. A Mach number computer for indicating the Mach number of a craft moving at both subsonic and supersonic speeds in air, means for measuring the ratio of static pressure to total pressure at a leading edge of the craft, means producing a first signal proportional to the ratio of static air pressure to total air pressure, a first computer for converting said first signal to a second signal proportional to the Mach number of said craft when moving at $M \leq 1$, a second computer for converting said first signal to a third signal proportional to the Mach number of said craft when moving at $M > 1$, switching means for connecting said first signal alternatively to said first or second computer, a sound radiating transducer arranged in said air stream, means sensing changes in the power radiated by said transducer into said air stream, means for comparing said power with the known power radiated by said transducer at Mach 1, and means responsive to said comparing means connected to said switching means for operating the same when the sound power radiated into said air stream equals the known power radiated at Mach 1.

5. A Mach number computer for indicating the Mach number of an aircraft moving at subsonic and supersonic speeds, the combination including a first sound radiating transducer facing into the air stream, a second sound transducer located in still air at the same temperature and static pressure as said air stream, means for supplying electrical energy to said transducers to cause them to radiate sound, means for comparing the electrical power consumed by the first transducer with the electrical power consumed by the second transducer, means for converting said comparison to a signal $M_D$ proportional to the downstream Mach number of the air stream in front of said first transducer, switching means alternatively connecting said signal $M_D$ for direct reading or to a computer for converting said $M_D$ signal to a signal $M_F$ representing the free stream velocity by the equation $$M_F^2 = \frac{2 + (\gamma - 1) M_D^2}{2\gamma M_D^2 - (\gamma - 1)}$$

where $\gamma$ is the ratio of specific heats for air, and means responsive to said signal M corresponding to $M_D = 1$ operation connected to said switching means for connecting said signal $M_D$ to said computer.

6. The method of determining shock front formations on an aircraft comprising radiating a sound signal of predetermined frequency into the air stream, continuously sensing changes in the average power P radiated, and observing when the sound power P radiated reaches a minimum indicating the instant of shock front formation.

References Cited in the file of this patent
UNITED STATES PATENTS

| | | |
|---|---|---|
| 1,743,414 | Wente | Jan. 14, 1930 |
| 2,671,620 | Andrews | Mar. 9, 1954 |
| 2,896,449 | Turner | July 28, 1959 |